United States Patent
Weinstein et al.

(10) Patent No.: US 7,309,109 B2
(45) Date of Patent: Dec. 18, 2007

(54) AXLE EXTENSION

(75) Inventors: Leslie J. Weinstein, Boise, ID (US); Erik R. Meinikheim, Boise, ID (US)

(73) Assignee: True Lock, LLC, Boise, ID (US)

( * ) Notice: Subject to any disclaimer, the term of this patent is extended or adjusted under 35 U.S.C. 154(b) by 223 days.

(21) Appl. No.: 11/181,430

(22) Filed: Jul. 14, 2005

(65) Prior Publication Data
US 2007/0013227 A1   Jan. 18, 2007

(51) Int. Cl.
*B60B 35/00* (2006.01)
*B60B 7/06* (2006.01)

(52) U.S. Cl. .............. 301/37.38; 301/108.5; 301/125; 301/128; 301/132

(58) Field of Classification Search ........... 301/37.101, 301/37.38, 105.1, 108.4, 111.05, 111.06, 301/125, 128, 130–132; 403/109.1, 109.4, 403/109.5; 293/58; 244/103 R, 103 W
See application file for complete search history.

(56) References Cited

U.S. PATENT DOCUMENTS

| | | | | | |
|---|---|---|---|---|---|
| 1,067,430 | A | * | 7/1913 | Jeffery | 301/35.54 |
| 1,379,558 | A | * | 5/1921 | Haffner | 301/130 |
| 1,446,531 | A | * | 2/1923 | Williams, Jr. | 244/103 W |
| 1,531,588 | A | * | 3/1925 | Williams, Jr. | 244/103 R |
| 1,713,963 | A | * | 5/1929 | Gurney | 280/93.512 |
| 1,846,269 | A | * | 2/1932 | Musselman | 156/130 |
| 2,023,128 | A | * | 12/1935 | Ferris | 280/11.26 |
| 2,443,760 | A | * | 6/1948 | Arrison | 301/37.38 |
| 3,324,701 | A | * | 6/1967 | Shultz | 72/393 |
| 3,810,679 | A | * | 5/1974 | Myers | 301/108.5 |
| 4,486,052 | A | * | 12/1984 | Taggart, Jr. | 301/130 |
| 5,881,835 | A | * | 3/1999 | Lucht et al. | 180/219 |
| 6,095,735 | A | | 8/2000 | Weinstein et al. | 411/221 |

* cited by examiner

*Primary Examiner*—Russell D. Stormer
(74) *Attorney, Agent, or Firm*—Joseph W. Holland

(57) ABSTRACT

An axle extension assembly for extending an axle having a longitudinal axle bore. The axle extension assembly includes a shaft having an axle bore insert portion that is adapted for insertion in the longitudinal axle bore. The axle bore insert portion includes a bore engaging element cooperative between the axle bore insert portion and the longitudinal axle bore for securing axle bore insert portion within the longitudinal axle bore. The shaft also includes an extension portion connected to and extending from the axle bore insert portion of the shaft. The extension portion includes an accessory engaging element.

5 Claims, 3 Drawing Sheets

AXLE EXTENSION

BACKGROUND OF THE INVENTION

1. Technical Field

The present invention relates generally to fasteners and more particularly to an axle extension assembly for extending an axle to provide support attachment for a wheel accessory.

2. Background

A wheel assembly, for instance for a light aircraft, may or may not include a fender. In those cases where fender is attached, an inner edge of the fender is typically fastened to a strut from which a stub axle extends and, as shown in FIG. 1, one or more braces extend from the fender to the strut to provide additional support for the fender. While this manner of providing additional support has proven to be satisfactory in some respects, the additional structure may provide undesirable obstruction, particularly when positioned near a location for ingress or egress.

Advantage may be found in providing a means for providing additional support for attachment for a wheel accessory to a stub axle.

It is therefore a general objective of the present invention to provide an axle extension assembly which provides an alternative point of attachment for a wheel accessory to a stub axle.

SUMMARY OF THE INVENTION

The present invention is directed to an axle extension assembly for extending an axle having a longitudinal axle bore. The axle extension assembly includes a shaft having an axle bore insert portion that is adapted for insertion in the longitudinal axle bore. The axle bore insert portion includes a bore engaging element cooperative between the axle bore insert portion and the longitudinal axle bore for securing axle bore insert portion within the longitudinal axle bore. The shaft also includes an extension portion connected to and extending from the axle bore insert portion of the shaft. The extension portion includes an accessory engaging element.

In the preferred embodiment of the invention, the bore engaging element is configured as a plurality of linearly extending fingers separated by a plurality of linearly extending spaced apart slits defining an expandable linear bore. A wedge plug is inserted into the expandable linear bore and a screw engages the wedge plug for drawing the wedge plug into the expandable linear bore for expanding the plurality of linearly extending fingers to secure the bore engaging element in the longitudinal axle bore of the axle. The axle extension portion further includes a shoulder section having a diameter greater than a diameter of the longitudinal axle bore of the axle to limit a depth of insertion of the axle extension assembly in the longitudinal axle bore of the axle. In the preferred embodiment of the invention, the extension portion includes a threaded aperture for threadedly engaging an accessory retaining screw.

The present invention is also directed to a wheel assembly including an axle including a shaft, the shaft including a bore extending along a longitudinal axis of the axle shaft with an external thread formed on the axle shaft. A wheel is mounted on the axle shaft and a nut threadedly engages the external thread of the axle shaft for retaining the wheel on the shaft. The wheel assembly including an axle extension assembly for extending the axle shaft, the axle extension including a shaft having an axle bore insert portion adapted for insertion in the longitudinal axle bore, the axle bore insert portion including a bore engaging element cooperative between the axle bore insert portion and the longitudinal axle bore for securing axle bore insert portion within the longitudinal axle bore. The shaft of the axle extension also including an extension portion connected to and extending from the axle bore insert portion of the shaft, the extension portion including an accessory engaging element. A wheel assembly accessory is attached to the extension portion by the accessory engaging element.

Additional advantages and novel features of the invention will be set forth in part in the description that follows, and in part will become apparent to those skilled in the art upon examination of the following, or may be learned by practice of the invention. Additionally, the advantages of the invention may be realized and attained by means of the instrumentalities and combinations particularly pointed out in the appended claims.

DETAILED DESCRIPTION OF THE INVENTION

Figure 1:
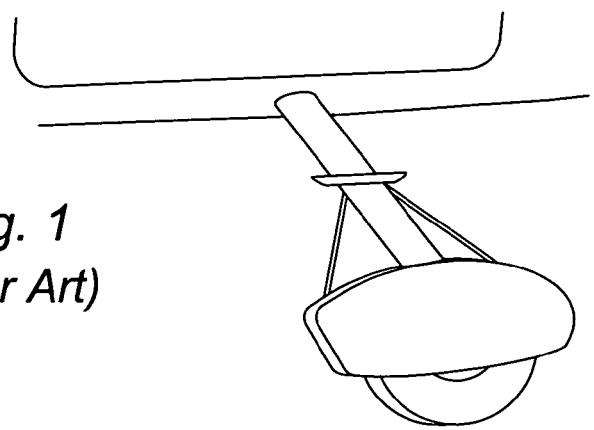
FIG. 1 is a representative perspective view of a wheel assembly for an aircraft according to the prior art.
Figure 2:
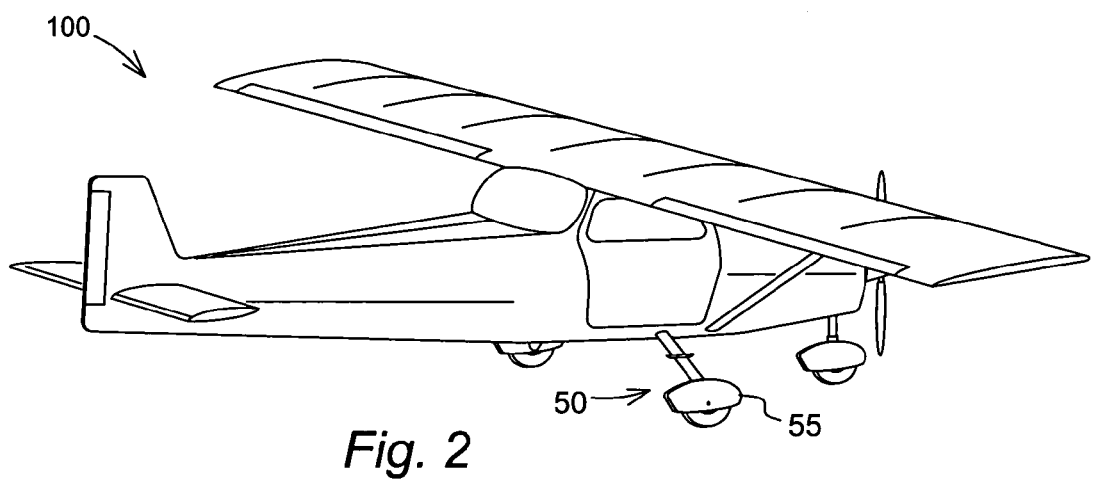
FIG. 2 is a representative perspective view of an aircraft including a landing gear having a wheel assembly according to the present invention.
Figure 3:
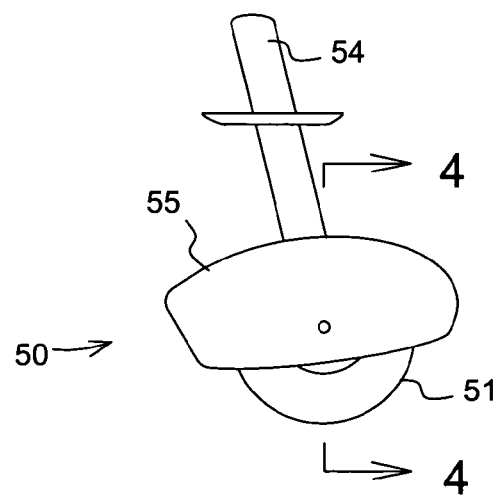
FIG. 3 is a representative perspective view of a wheel assembly for an aircraft according to the present invention.

FIG. 2 is a representative perspective view of aircraft 100 including wheel assembly 50 having fender 55. FIG. 3 is a representative perspective view of a wheel assembly of wheel assembly 50 including strut 54, tire 51 and fender 55.

Figure 4:
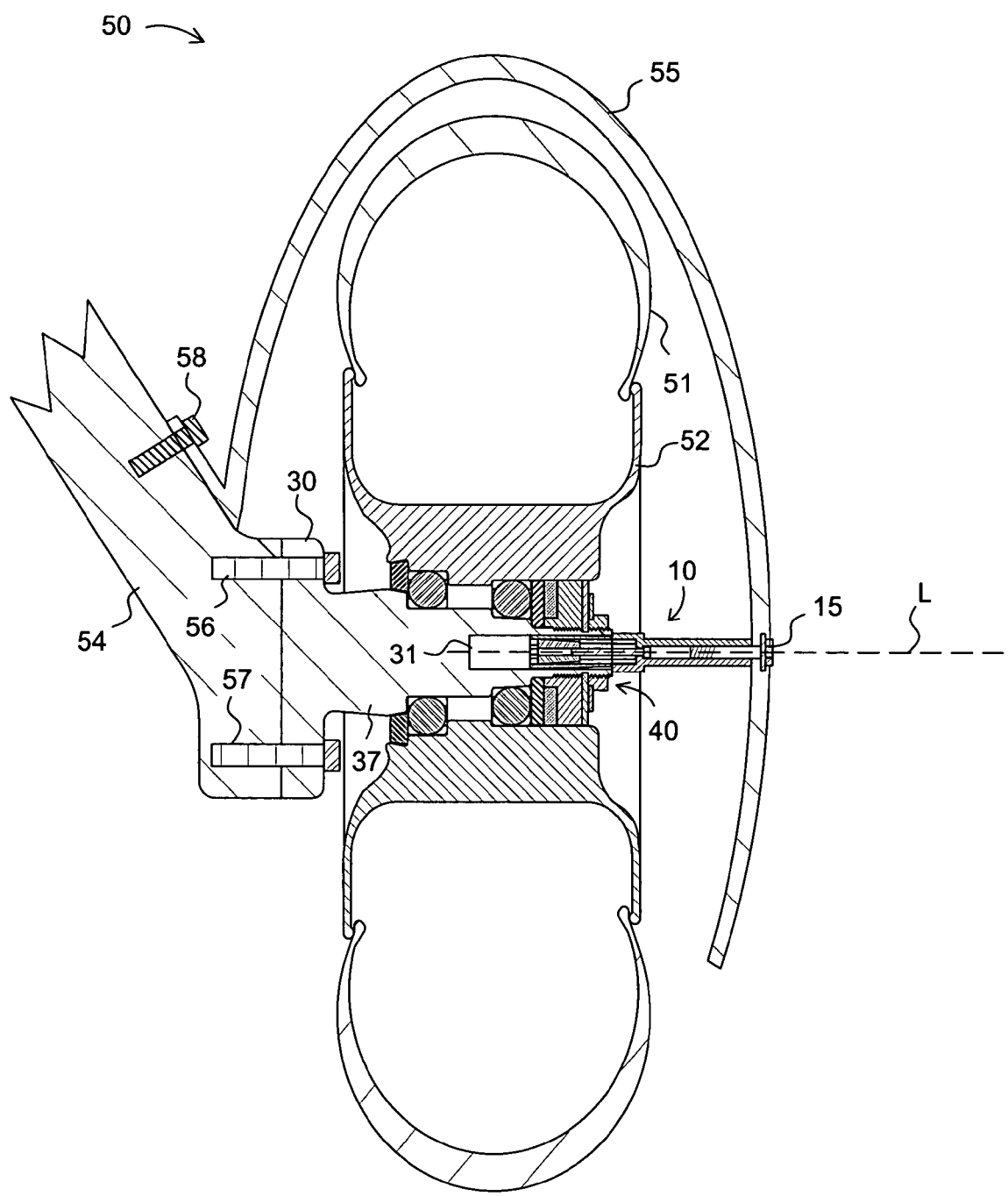
FIG. 4 is a representative partial sectional view of a wheel and axle assembly including an axle extension assembly according to the present invention.
Figure 5:
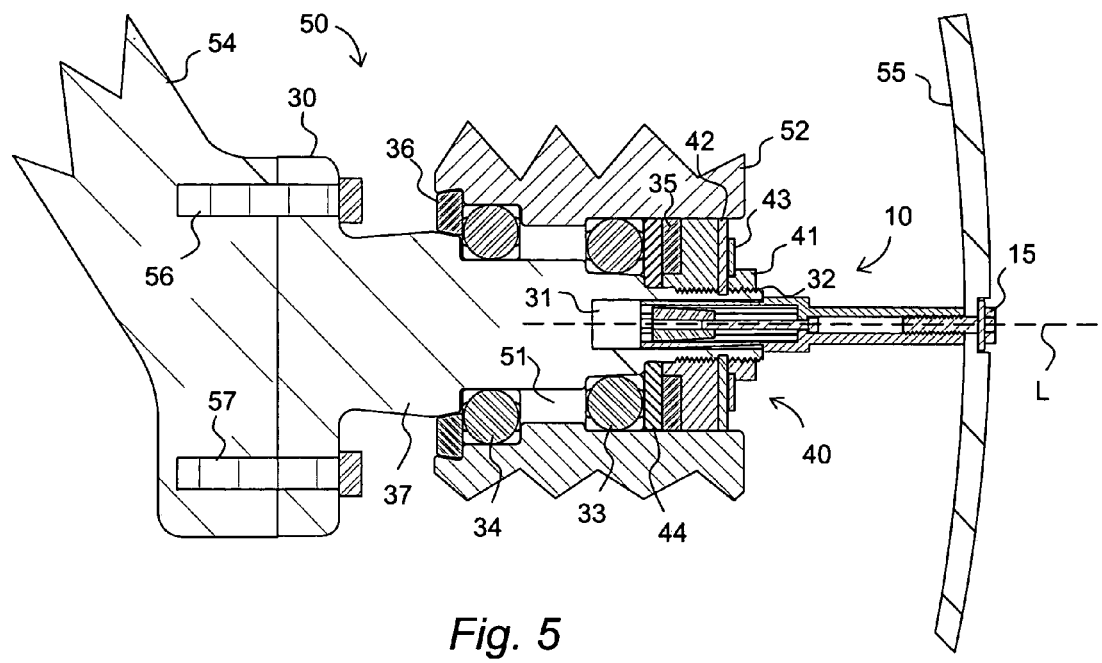
FIG. 5 is a representative detail sectional view of a wheel and axle assembly including an axle extension assembly according to the present invention.

Referring to FIGS. 4 and 5 show stub axle 30 attached to strut 54 by screws 56 and 57. Wheel assembly 50 is attached to shaft 37 of stub axle 30. Wheel assembly 50 includes tire 51 mounted to wheel 52. Stub axle 30 includes bore 31 formed along a longitudinal axis L of stub axle 30. Fender 55 is attached to strut 54 by screw 58. Fender 55 is also connected to stub axle 30 by accessory retaining screw 15 of axle extension assembly 10.

FIG. 5 shows wheel 52 including mounting aperture 51 which is positioned about stub axle 30. Font and rear bearings 33 and 34 respectively provide reduced friction between wheel 52 and stub axle 30. Front and rear seals 35 and 36 respectively limit the entry of foreign matter and moisture into mounting aperture 51.

Referring to FIG. 5, wheel 52 is shown attached to stub axle 30 employing lock nut assembly 40. Lock nut assembly 40 is similar to that described and depicted in U.S. Pat. No. 6,095,735, which is incorporated by reference herein. Lock-nut assembly 40 includes nut 41, lock washer 42, retainer clip 43 and washer 44. Nut 41 engages thread 32 of stub axle 30.

Figure 6:
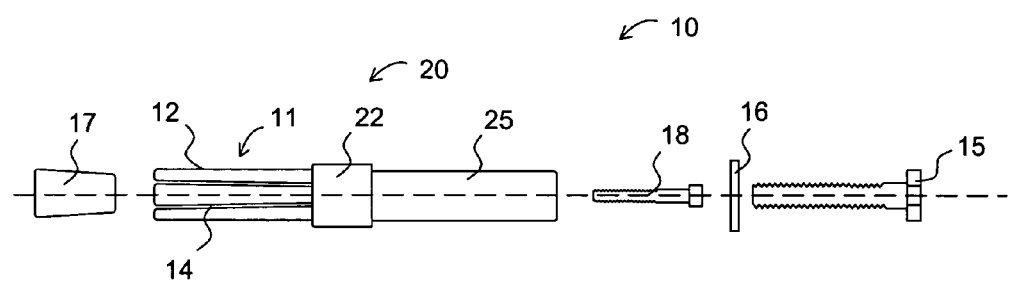
FIG. 6 is a representative exploded view of an axle extension assembly according to the present invention.
Figure 7:
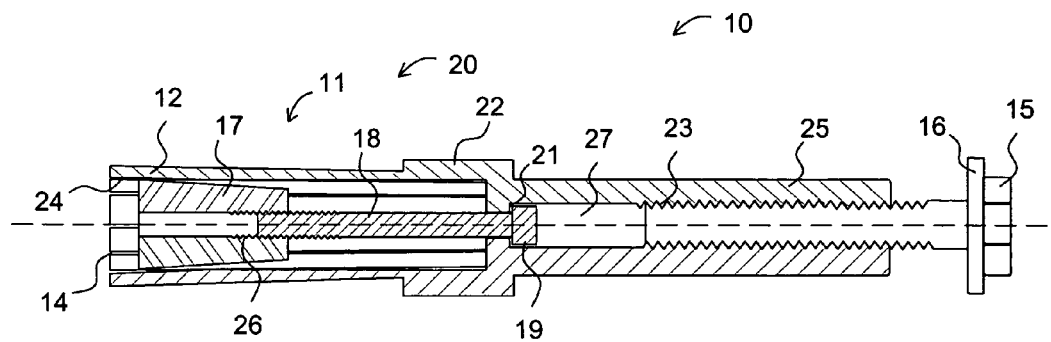
FIG. 7 is a representative side sectional view of an axle extension assembly according to the present invention.

Referring to FIGS. 6 and 7, axle extension assembly 10 is shown including shaft 20 including axle bore insert portion 11 and extension portion 25. Axle bore insert portion 11 includes a plurality of linearly extending fingers 12 which are separated by a plurality of linearly extending spaced apart slits 14. Axle bore insert portion 11 also includes wedge plug 17 and screw 18. As seen in FIGS. 6 and 7, shaft 20 also includes extension portion 25 which is connected to and extends from axle bore insert portion 11 of shaft 20. Extension portion 25 includes shoulder section 22 which is sized having a diameter greater than bore 31 of stub axle 30 to limit the depth of insert of insert portion 11, as seen in FIG. 5. Extension portion 25 also includes accessory retaining screw 15 and washer 16 for engaging a wheel assembly accessory, in this case fender 55, as shown in FIG. 5.

Referring to FIG. 7, wedge plug 17 includes threaded aperture 26. Aperture 27 of extension portion 25 includes shoulder 21 against which head 19 of screw 18 seats. Wedge plug 17 is drawn into expandable linear bore 24 of axle bore insert portion 11 by screw 18 causing the plurality of linearly extending fingers 12 to engage bore 31 of stub axle 30 as seen in FIG. 5. FIG. 7 also shows extension portion 25 including aperture 27 having threads 23 for threadedly engaging accessory retaining screw 15.

It is to be understood that the invention is not limited to the embodiment shown and described above. Various other embodiments of the invention may be made and practiced without departing from the scope of the invention, as defined in the following claims.

What is claimed is:

1. A wheel assembly comprising:
    an axle including a shaft, the shaft including a bore extending along a longitudinal axis of the axle shaft;
    an external thread formed on the axle shaft;
    a wheel mounted on the axle shaft;
    a nut threadedly engaging the external thread of the axle shaft for retaining the wheel on the shaft; and
    an axle extension assembly for extending the axle shaft, the axle extension including a shaft including an axle bore insert portion adapted for insertion in the longitudinal axle bore, the axle bore insert portion including a bore engaging element cooperative between the axle bore insert portion and the longitudinal axle bore for securing axle bore insert portion within the longitudinal axle bore, the shaft also including an extension portion connected to and extending from the axle bore insert portion of the shaft, the extension portion including an accessory engaging element; and
    a wheel assembly accessory attached to the extension portion by the accessory engaging element.

2. The wheel assembly of claim 1 wherein the bore engaging element further comprises:
    a plurality of linearly extending fingers separated by a plurality of linearly extending spaced apart slits forming an expandable linear bore;
    a wedge plug inserted into the expandable linear bore; and
    a screw threadedly engaging the wedge plug for drawing the wedge plug into the expandable linear bore for expanding the plurality of linearly extending fingers.

3. The wheel assembly of claim 1 wherein the extension portion further comprises a shoulder section including a diameter greater than a diameter of the longitudinal axle bore of the axle.

4. The wheel assembly of claim 1 wherein the accessory engaging element further comprises the extension portion including a threaded aperture for threadedly engaging an accessory retaining screw.

5. The wheel assembly of claim 1 wherein the wheel assembly accessory further comprises a fender.

* * * * *